July 29, 1969 R. F. DAWSON 3,458,073
ROAD VEHICLE MOUNTED RACK FOR STOWING A MOTORCYCLE OR THE LIKE
Filed July 24, 1967 2 Sheets-Sheet 1
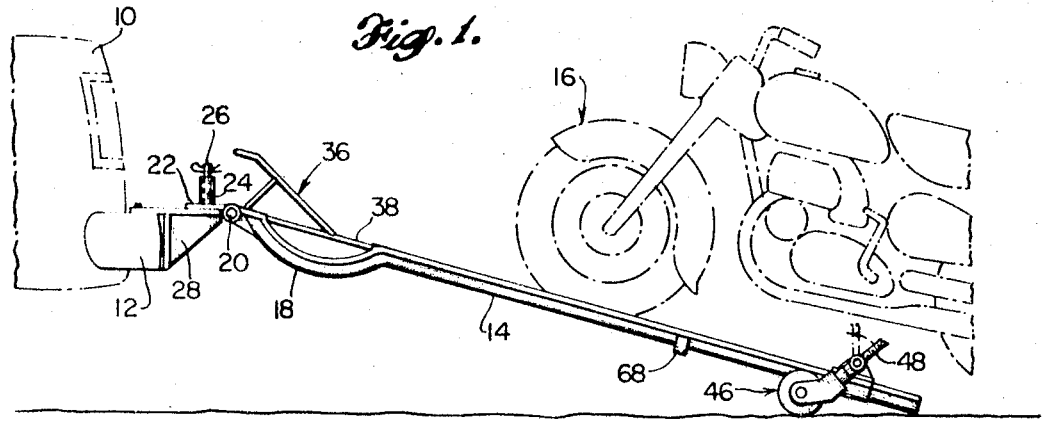
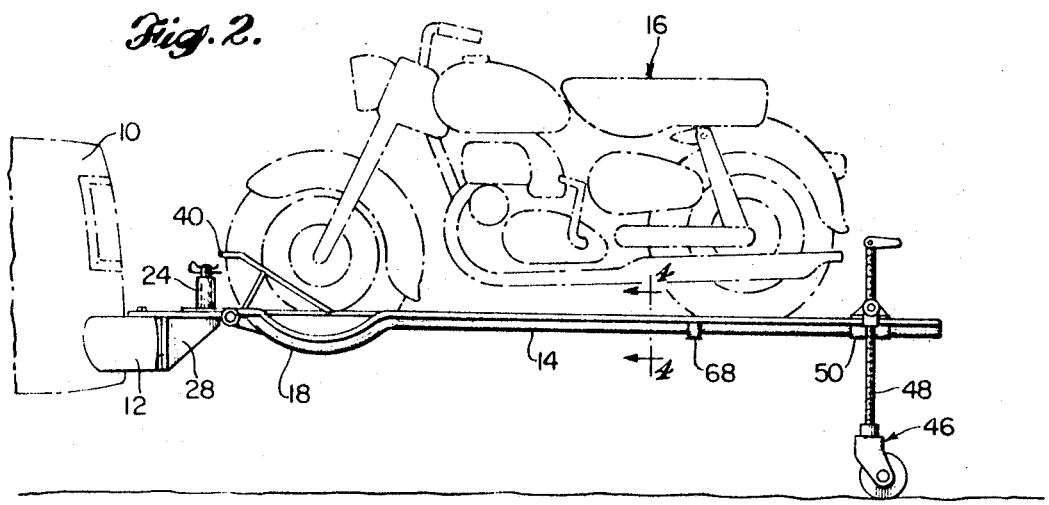
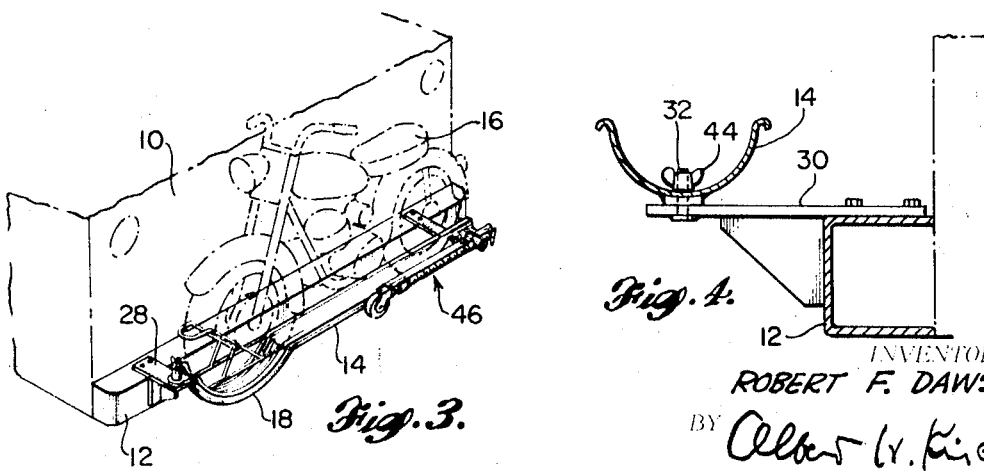
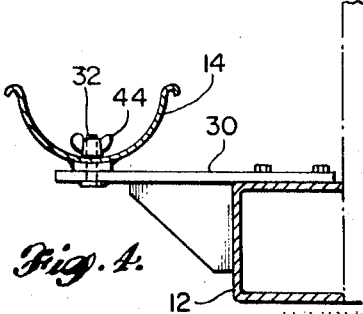
INVENTOR.
ROBERT F. DAWSON
BY Albert W. Kirchner
ATTORNEY

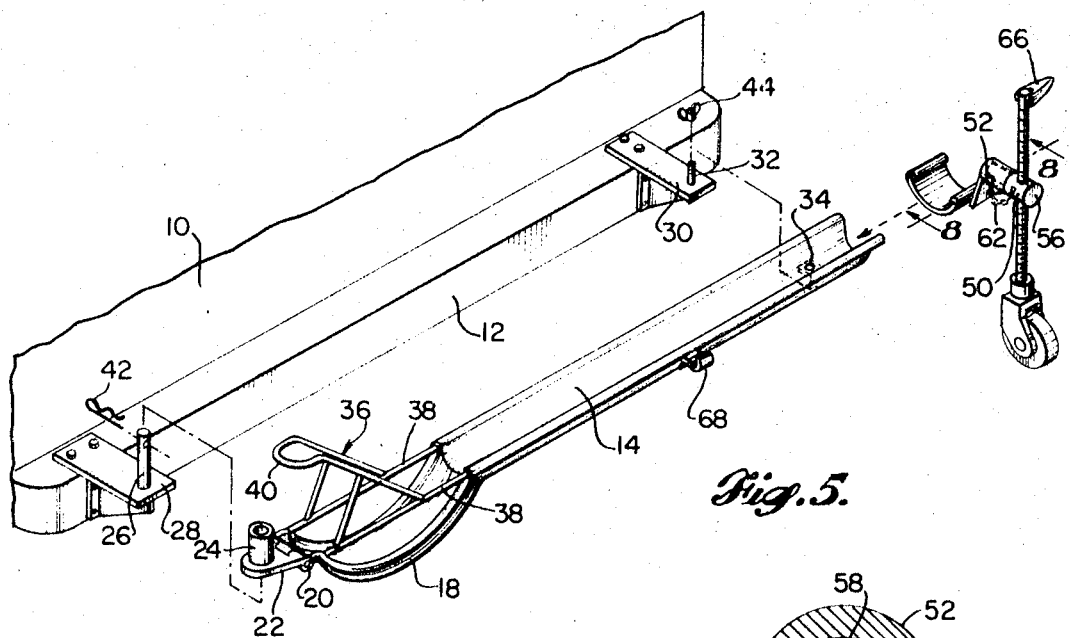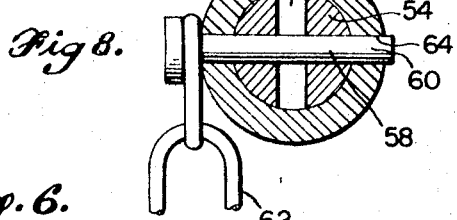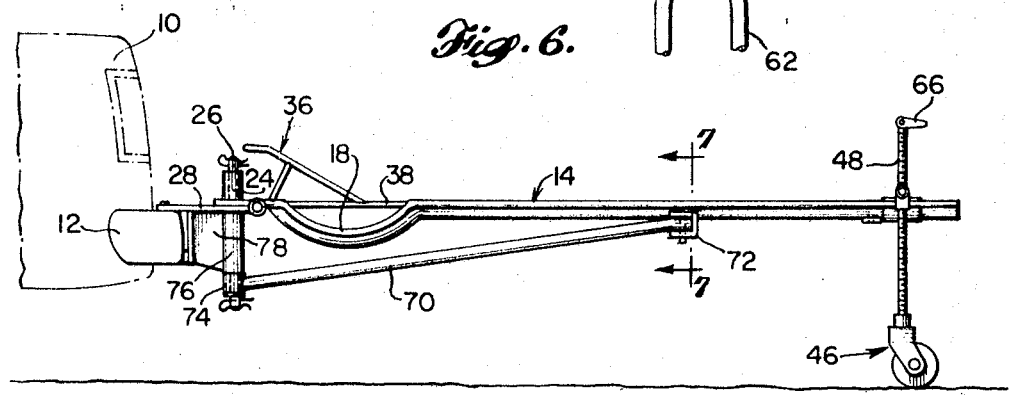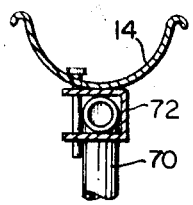

United States Patent Office 3,458,073
Patented July 29, 1969

3,458,073
ROAD VEHICLE MOUNTED RACK FOR STOWING A MOTORCYCLE OR THE LIKE
Robert F. Dawson, Rte. 8, Box 8839, Bainbridge Island, Winslow, Wash. 98110
Filed July 24, 1967, Ser. No. 655,640
Int. Cl. B60r 9/10
U.S. Cl. 214—450                                                    2 Claims

ABSTRACT OF THE DISCLOSURE

An elongated channel-shaped rack member has one end hinged and pivoted to one end portion of the rear bumper of a motor vehicle or trailer so that, with the member swung out to extend rearwardly and its free end lowered to the ground, a motorcycle or like tandem wheeled vehicle can be run onto it and the member can then have its free end lifted and be swung toward the bumper and be latched thereto so as to stow the supported vehicle for transportation.

---

The present invention provides a rack, adapted to be mounted on a road vehicle, for stowing a motorcycle, bicycle, scooter or similar type of small vehicle having two wheels in tandem, so that the stowed vehicle can be transported by the road vehicle without occupying any of the normally usable load space thereof.

A principal object of the invention is to equip a passenger carrying automobile, a truck, house trailer or the like with mounting and stowing means for a cycle or the like which will securely and safely hold the cycle, which permits the cycle to be stowed and unloaded with a minimum of effort, regardless of how heavy, large or generally cumbersome it may be, and which is simple in construction, capable of being made at low cost, and durable and efficient in use.

The invention is intended particularly for application to the family car or trailer to provide means by which a motorcycle or like vehicle, as above indicated, can be transported on a motor trip without in any way detracting from load-carrying space within or on the hauling vehicle, and without interfering with means for coupling some trailing vehicle, such as a wheeled boat carrier or the like, and without preventing access to any rear door, trunk or the like of the hauling vehicle.

A preferred embodiment of the invention which has been reduced to actual practice and found entirely satisfactory in achieving the objects of the invention, and which for that reason is presently preferred, is shown in the accompanying drawings in which:

FIGURE 1 is a side elevational view of the rack, shown installed on the bumper of a house trailer, disposed in rearwardly extended lowered position for loading or removal of a motorcycle;

FIG. 2 is a similar view showing the motorcycle loaded on the rack and the rack elevated preparatory to swinging to stowed position on the bumper;

FIG. 3 is a perspective view showing the loaded rack disposed in stowed position on the bumper;

FIG. 4 is a detail sectional view through the rack and bumper taken on the line 4—4 of FIG. 2;

FIG. 5 is a perspective exploded view of the rack and bumper showing the manner in which the rack is applied to the bumper;

FIG. 6 is a side elevational view showing the rack unloaded and rearwardly extended in elevated position, ready to be swung and stowed empty on the bumper;

FIG. 7 is a detail sectional view through the rack taken on the line 7—7 of FIG. 6; and FIG. 8 is a relatively enlarged detail view through the caster pivot connection taken on the line 8—8 of FIG. 5.

In these figures the reference numeral 10 designates the rear portion of a conventional road vehicle, such as an automobile, truck, house trailer or the like, having a rear bumper 12 or equivalent substantial frame or body member forming the extreme rear of the vehicle.

The rack provided by the present invention comprises principally a relatively long and narrow main supporting member 14 which is of channel or trough shape, as best shown in FIGS. 4 and 7, with its concave side uppermost and so proportioned in width and depth as reasonably snugly to receive and hold in nested relation the tires of a motorcycle (in the case of the presently disclosed embodiment of the invention) or (in other embodiments, modified in size) the tires of a bicycle, scooter or other two-tandem-wheeled vehicle, as will be understood.

The main supporting member is of appropriate length to receive the two tandem wheels of the vehicle to be stowed on the rack, hereinafter generically referred to as the motorcycle 16, in straight alignment along the length of the member; and to position the motorcycle in lengthwise fixed location on the rack the member is formed in one end portion with an arcuately depressed pocket 18. The arc of this pocket is of substantially the radius of the motorcycle wheels, including the tires, so that one of the wheels can be snugly nested in the pocket, and the length of the member is such that when said one wheel is in the pocket the other wheel will stand in the member slightly inward from the other end of the member.

The end of the member 14 adjacent to the pocket 18 is connected by a pivot pin 20 to a hinge plate 22 on which is fixedly mounted, as by welding, an upstanding sleeve 24. The hinge plate is perforated beneath the sleeve so that the plate and sleeve can be dropped over a pin 26 upstanding from the outer end portion of a bracket 28 which is bolted to one end portion of the road vehicle bumper 12 and projects right-angularly rearwardly therefrom, all as best shown in FIG. 5.

A generally similar bracket 30, having an upstanding pin 32, is bolted to the bumper near its opposite end, and a hole 34 is provided in the center bottom of the member 14 so that the member can be dropped onto the bracket 30, with the pin 32 in the hole 34, the member being thus supported on the two brackets 28 and 30 and being held in place by the pins 26 and 32 securely in parallelism to the length of the bumper 12.

It will be evident that the supporting member 14 can be changed from the foregoing placement, which is its stowed position, by simply lifting its outer or free end to disengage the pin 32 from the hole 34, while the member pivots up about the pin 20, whereupon the member can be swung outwardly from its FIG. 3 position, to extend right-angularly out from the bumper, in the position shown in FIG. 1.

As is also shown in FIG. 1, when the member 14 is disposed in what may be considered its extended position, a motorcycle 16 (or other two-tandem-wheeled vehicle) may be rolled up on the inclined member until its foremost wheel, preferably its front wheel as shown, nests in the pocket 18. At this time the other wheel is on the member, and the member can be lifted to substantially horizontal position and then be swung laterally some 90° into parallelism with the bumper 12; the hole 34 can be dropped over the pin 32, and the member 14 be thereby securely latched in stowed position along the bumper.

The foregoing are the essential elements and principles of the new rack and the manner in which it is used.

Certain additional structure is desirably included in the complete embodiment of the invention which constitutes the best mode of practicing it and which has been used with success in actual reduction to practice, and this will now be described.

To hold the mounted motorcycle 16 securely in stowed position on the rack, the member 14 is best provided with a guard 36 over the pocket 18. This may take the form of a pair of stout rods 38 standing in the lines of the respective lips of the channel that constitutes the member, with an upstanding framework mounted on the rods and formed of similar rod stock to provide an elevated loop or bight 40 adapted to receive the motorcycle tire and form an abutment for it at about mid-height, as shown in FIGS. 2 and 3, thus stabilizing the motorcycle and preventing its accidentally falling off of the rack.

To keep the hinge plate 22 more or less permanently connected to the bracket 28, a conventional cotter pin or the like 42 may be fitted into the protruding top portion of the pin 26.

To hold the stowed rack temporarily in stowed position the pin 32 at the other end of the bumper may have its upper end portion screwthreaded for reception of a wing nut 44. To facilitate elevating the rack from its downwardly inclined loading position shown in FIG. 1, after the very substantial weight of a motorcycle has been loaded onto it, and to facilitate also the lateral swinging of the loaded member in stowing and unloading, it is desirable to provide the outer, free end portion of the member with a combined jack and caster mount. This is conveniently made in the form of a conventional caster roller or small wheel 46 swiveled on the lower end of a screwthreaded rod 48 which is pivotally connected to the free end portion of the member 14. As best shown in FIGS. 5 and 8, this connection is made by means of bracket 50, welded or otherwise secured to the outer face of the member 14. The bracket terminates in an outstanding sleeve 52 which journals a pivot pin 54 which is headed at its inner end to prevent withdrawal from the sleeve and which is radially enlarged at its outer end portion 56 and there provided with an internally threaded hole in which the screw rod 48 is meshed. The pivot pin 54 is provided with two through holes 58, at 90° separation, each adapted alternatively to receive a locking pin 60 which is held captive on one end of a chain 62. The other end of the chain is fixed to the outer enlarged end of the pivot pin 54. A single hole is formed through the bracket sleeve 52. Thus the rod 48 may be swung about by the pivot formed by the sleeve 52 and pin 54 between the vertical position shown in FIG. 6 and the horizontal position shown in FIG. 3 and may be latched in either position by insertion of the pin 60 into the aligned holes in the pin and sleeve members of the pivot.

A handle 66 on the top end of the rod 48 serves a crank for turning the rod and causing it to function as a jack to raise or lower the member 14.

A keeper in the form of a clip 68 may be secured to the outer lip portion of the member 14 to receive and hold the rod 48 in its retracted position shown in FIG. 3.

If the motorcycle or the like that is to be mounted on the rack is of very considerable weight, it may be found desirable to provide the member 14 with a brace element as shown at 70 in FIG. 6. This can be formed of a stout rod having one end fixed to the member 14, as shown at 72 and its other end provided with a sleeve 74 which is pivotally connected to an extension of the pin 26 which is projected down through a tubular edge portion 76 formed on a gusset constituting a strengthening part of the bracket 28.

The brace element 70 has been found particularly useful also in making it possible to swing the loaded rack to the extended position of FIG. 6 without requiring movement of the jack and caster mount to the operative position shown in that figure. This capability of the braced form of the device is specially desirable in connection with vehicles whose trunks, tail gates, rear doors, spare wheels or other rear parts or fixtures may not be conveniently accessible with the rack loaded and in stowed position.

It is to be understood that in addition to the foregoing details which improve and enhance the utility of the basic inventive concept, other and further features may be incorporated, and changes may be made in the particulars of the exemplary form of the invention which has been shown and described in this application for letters patent. All such additions and modifications, to the extent that they are encompassed within the scope of the appended claims, are to be deemed within the spirit of the invention and within the scope and purview of the claims.

I claim:

1. In a rack device for mounting a motorcycle or like tandem wheeled vehicle on a road vehicle, which device comprises an elongated main supporting member having inner and outer ends and an intermediate generally channel shape for receiving and mounting the tires of said tandem wheels, with means at said inner end for connecting the member for vertical and horizontal pivoting to one end portion of the rear bumper or the like of a hauling vehicle and means at the outer end of the member for latching it to the other end portion of said bumper or the like, the improvement which comprises mounting a caster at said outer end of the member for engagement with the ground to support said end for swinging movement of the member laterally about said pivoting means, the mounting means for said caster comprising a bracket mounted on said outer end of the member, a pin journaled in the bracket for pivotal movement about a horizontal axis, a screwthreaded rod meshed in said pin and having the caster swiveled to its lower end, and means for fixing said pin at positions 90° apart so that the rod can be set in a vertical operative position with the caster on the ground or in a horizontal inoperative position along-side the member.

2. A road vehicle mounted rack for a motorcycle or like tandem wheeled vehicle comprising an elongated main supporting member having inner and outer ends and an intermediate generally channel shape for receiving and mounting the tires of said tandem wheels, means pivoting and hinging said member to the bumper or the like of a hauling vehicle, said means consisting of a single bracket plate having one end provided with vertical pivot means for mounting the plate for horizontal swinging relation to one end portion of said bumper or the like and having its other end hinged about a horizontal axis to the inner end of the member for vertical swinging of the member, a vertically adjustable caster secured in depending relation to the outer end of the member for lowering into engagement with the ground, lifting or lowering the outer end of the member as the member swings vertically about said hinge axis, and supporting the member in substantially horizontal position as the member is swung laterally about said vertical pivot axis, and means at the outer end of the member for latching it detachably to the other end portion of said bumper or the like, whereby the member may be swung out and down for loading or unloading and up and in far stowing the tandem wheeled vehicle in upright position on said bumper or the like.

References Cited

UNITED STATES PATENTS

| 3,153,489 | 10/1964 | Leavengood et al. | 214—85 |
| 3,193,120 | 7/1965 | Hudson | 214—85 |
| 3,366,256 | 1/1968 | Meredith et al. | 214—450 |

FOREIGN PATENTS 97,617  12/1939  Sweden.

HUGO O. SCHULZ, Primary Examiner

U.S. Cl. X.R.

214—85; 224—42.08